United States Patent [19]
Nakanishi

[11] Patent Number: 5,731,683
[45] Date of Patent: Mar. 24, 1998

[54] ELECTRONIC APPARATUS

[75] Inventor: Hideki Nakanishi, Tokyo, Japan

[73] Assignee: Canon Kabushiki Kaisha, Tokyo, Japan

[21] Appl. No.: 555,075

[22] Filed: Nov. 8, 1995

[30] Foreign Application Priority Data

Nov. 14, 1994 [JP] Japan .................................. 6-278684

[51] Int. Cl.⁶ .................................................. H02J 7/00
[52] U.S. Cl. ...................................... 320/2; 320/15; 320/9
[58] Field of Search ................................. 320/2, 15, 14, 320/9, 21, 19

[56] References Cited

U.S. PATENT DOCUMENTS

| | | | |
|---|---|---|---|
| 5,084,775 | 1/1992 | Kodama et al. | 358/335 |
| 5,150,032 | 9/1992 | Ho | 320/14 |
| 5,191,277 | 3/1993 | Ishikura et al. | 320/22 |
| 5,300,874 | 4/1994 | Shimamoto et al. | 320/15 |
| 5,371,456 | 12/1994 | Brainard | 320/31 |
| 5,382,893 | 1/1995 | Dehnel | 320/32 |

FOREIGN PATENT DOCUMENTS

588727 A1   3/1994   European Pat. Off. ............... 320/61

*Primary Examiner*—Peter S. Wong
*Assistant Examiner*—K. Shin
*Attorney, Agent, or Firm*—Fitzpatrick, Cella, Harper & Scinto

[57] ABSTRACT

A power supply is detachably attached to an outside surface of an outer casing of an electronic apparatus which can be driven by both a battery and an AC adaptor. The power supply includes a battery, a first connector for detachably connecting the AC adaptor, a switch for switching a mode for performing a power supply to the electronic apparatus by an output of the battery or a mode for performing such a power supply by an output of the AC adaptor connected to the first connector, and a second connector for a power source output which is detachably connected to an AC adaptor connector of the electronic apparatus. When the AC adaptor is not connected to the first connector, the output of the battery is applied to the second connector through the switch. When the AC adaptor is connected to the first connector, the output of the AC adaptor is applied to the second connector.

14 Claims, 7 Drawing Sheets

FIG. 3A
PRIOR ART
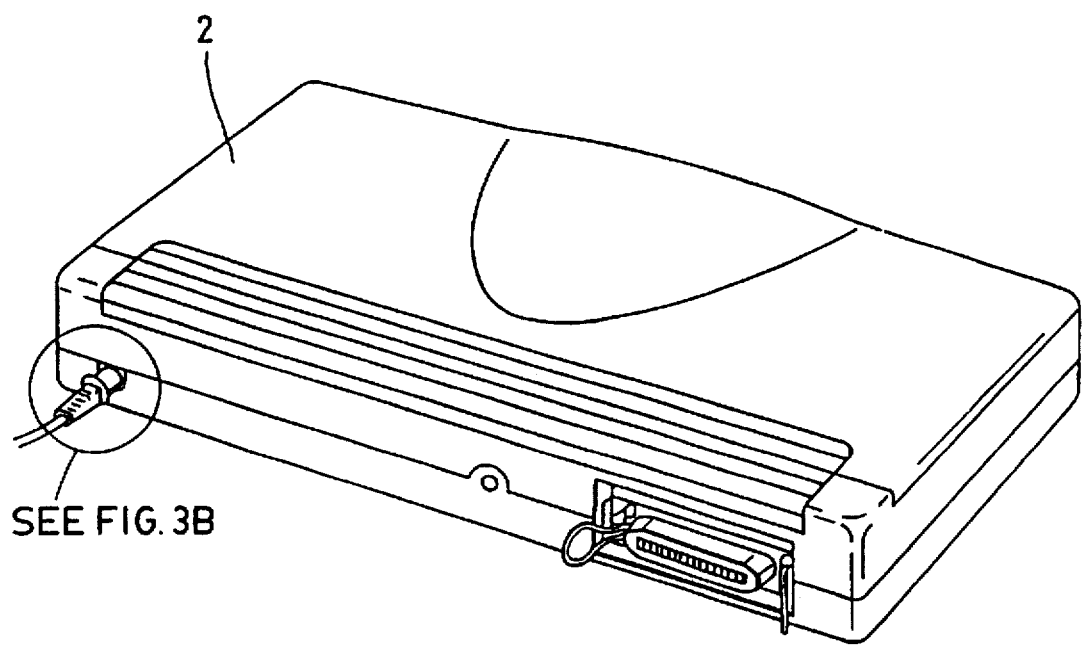
SEE FIG. 3B
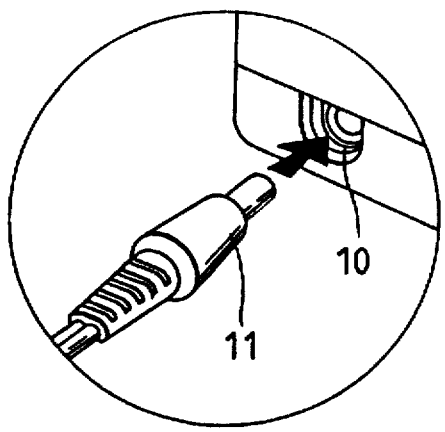
FIG. 3B
PRIOR ART

ELECTRONIC APPARATUS

BACKGROUND OF THE INVENTION

1. Field of the Invention

The invention relates to an electronic apparatus which can be driven by both a battery and an AC adaptor.

2. Related Background Art

A conventional construction of a power supply to an electronic apparatus which can be driven by both a battery and an AC adaptor will be described with reference to FIGS. 3A, 3B, 4A, and 4B. It is now assumed that the electronic apparatus is a printer.

First, in case of driving the printer by an AC adaptor, as shown in FIG. 3A and 3B, a plug 11 of the AC adapter connected to a commercially available power source (not shown) is connected to a jack 10 provided in the outer casing of a printer 2, thereby supplying an electric power.

In case of subsequently driving by a battery, the battery is constructed as a battery pack which is packed so as to be detachable to/from the entire printer. In case of an externally attaching type, as shown in FIGS. 4A and 4B, a plug (common to a plug of the AC adaptor) 11' of a battery pack 9' by attaching the battery pack 9 to the outside surface of the outer casing of the printer 2 through a screw 13 or the like, is connected to the jack 10 of the printer 2, thereby supplying an electric power.

There is also a case where the battery pack 9 is constructed so as to be enclosed in the printer 2, the battery pack 9 is attached into the printer 2, and power source terminals (not shown) of the battery pack 9 and printer 2 are electrically connected, thereby supplying an electric power.

The above construction, however, has the following problems.

(1) In case of the type in which the battery pack 9 is attached from the outside to the outer casing of the printer 2.

For example, at the time of the driving of the printer 2 by the battery pack 9, when the battery suddenly enters a low battery (decrease in electromotive force) state, it is necessary to first temporarily stop the printing operation by the battery and remove the battery pack 9 in the low battery state from the printer 2 and again charge the battery pack. After that, in case of still continuing the printing, the AC adaptor has to be connected to the printer 2 or the charged battery pack 9 has to be again attached.

Namely, there are the following inconveniences in terms of the operability.

a) Each time the battery enters the low battery state, the battery pack 9 has to be removed from the printer 2 in order to charge the battery.

b) Unless the charged battery pack 9 is again attached to the printer 2 or the AC adaptor is connected thereto, the printing operation cannot be continued.

c) The printing operation has to be stopped each time for the above operation.

(2) In case of the type in which the battery pack 9 is enclosed in the printer 2.

In this case, an external size of the printer 2 increases by at least the size of the battery pack 9 at the designing stage of the printer. Or, it is necessary to miniaturize the other component elements (electric circuit parts, mechanical parts, etc.) in the printer 2 by only the size of the battery pack 9. Those points result in a disadvantage on designing in case of realizing the miniaturization of the entire printer.

SUMMARY OF THE INVENTION

It is an object of the invention to provide an electronic apparatus which can be driven by both a battery and an AC adaptor, wherein the drawbacks as mentioned above can be solved and when a power supply is switched from the battery to the AC adaptor, such a switching can be performed with a power supply attached to the electronic apparatus, and there is no need to interrupt the power supply, and a miniaturization can be realized.

To accomplish the above object, according to the present invention, there is provided a power supply which is detachably attached to the outside surface of an outer casing of an electronic apparatus which can be driven by both a battery and an AC adaptor. The power supply comprises a battery; a first connecting member for detachably connecting the AC adaptor; a switch for switching a mode for performing a power supply to the electronic apparatus by an output of the battery or a mode for performing such a power supply by an output of the AC adaptor connected to the first connecting member; and a second connecting member for a power source output that is detachably connected to an AC adaptor connecting member of the electronic apparatus. When the AC adaptor is not connected to the first connecting member, the output of the battery is applied to the second connecting member through the switch, and when the AC adaptor is connected to the first connecting member, the output of the AC adaptor is applied to the second connecting member through the switch.

BRIEF DESCRIPTION OF THE DRAWINGS

FIGS. 3A and 3B are perspective views showing a conventional power supply by an AC adaptor;

DESCRIPTION OF THE PREFERRED EMBODIMENT

Figure 1:
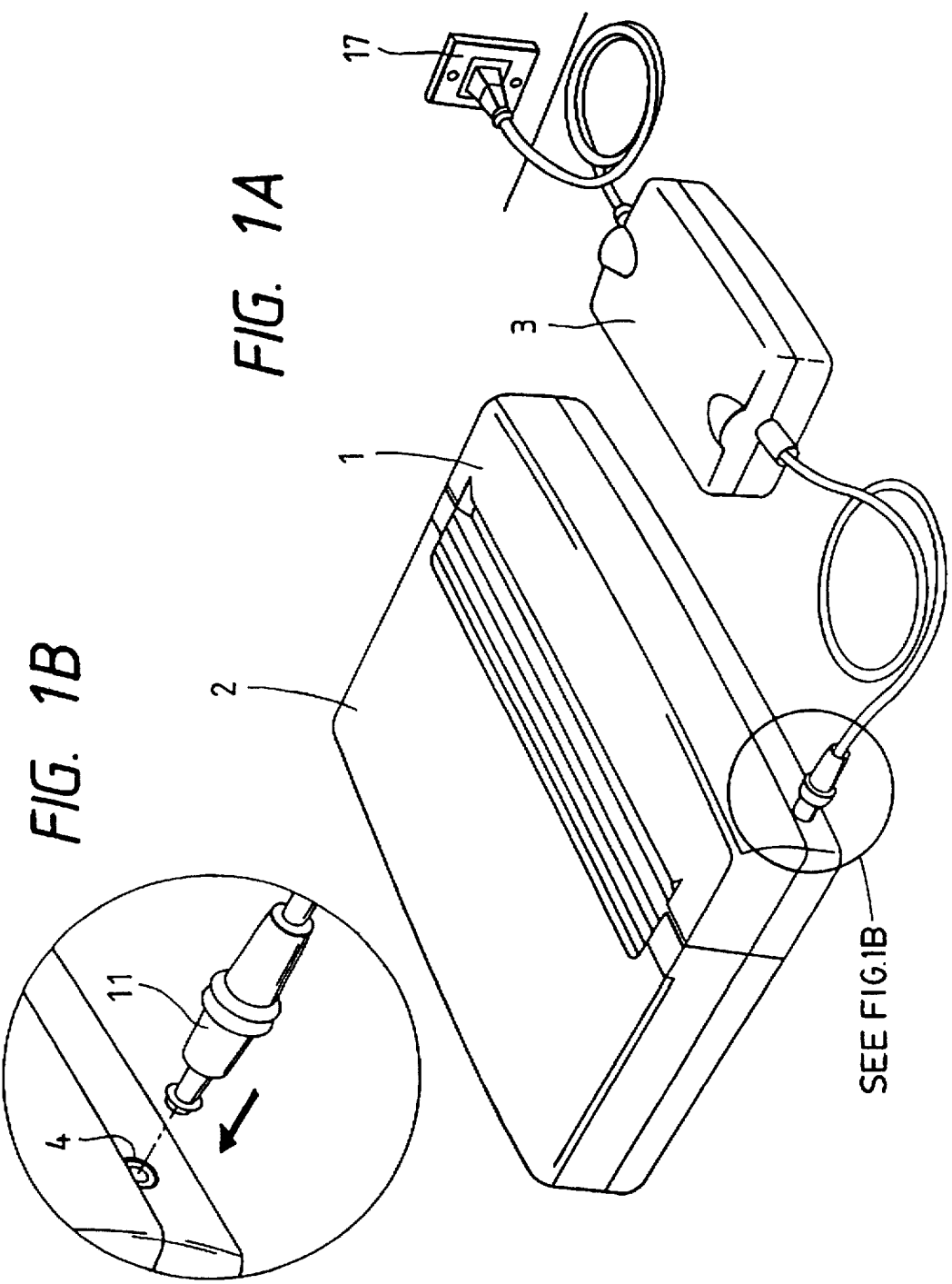
FIGS. 1A and 1B are perspective views showing an external appearance of a state in which a power supply is attached to a printer according to an embodiment of the invention.

An embodiment of the invention will now be described hereinbelow with reference to the drawings. A printer is shown as an example of an electronic apparatus which can be driven by both a battery and an AC adaptor.

FIGS. 1A and 1B show external views of the printer of the embodiment of the invention.

Reference numeral 1 denotes a power supply. The power supply 1 is detachably attached through an attaching member (not shown) to the outside surface of an outer casing of the printer 2 which can be driven by both a battery and an AC adaptor. A plug 8 (refer to FIG. 2) provided for the power supply 1 is connected to an AC adaptor connecting jack (not shown) provided in the outer casing of the printer 2. A jack 4 is provided in the outer casing of the power supply 1. The plug 11 of an AC adapter 3 which is connected to an electric outlet 17 of a commercially available power source can be detachably connected to the jack 4. A mechanical portion such as a printer head and the like and an electronic portion such as a CPU for controlling the mechanical portion and the like are inserted in the printer 2.

Figure 2:
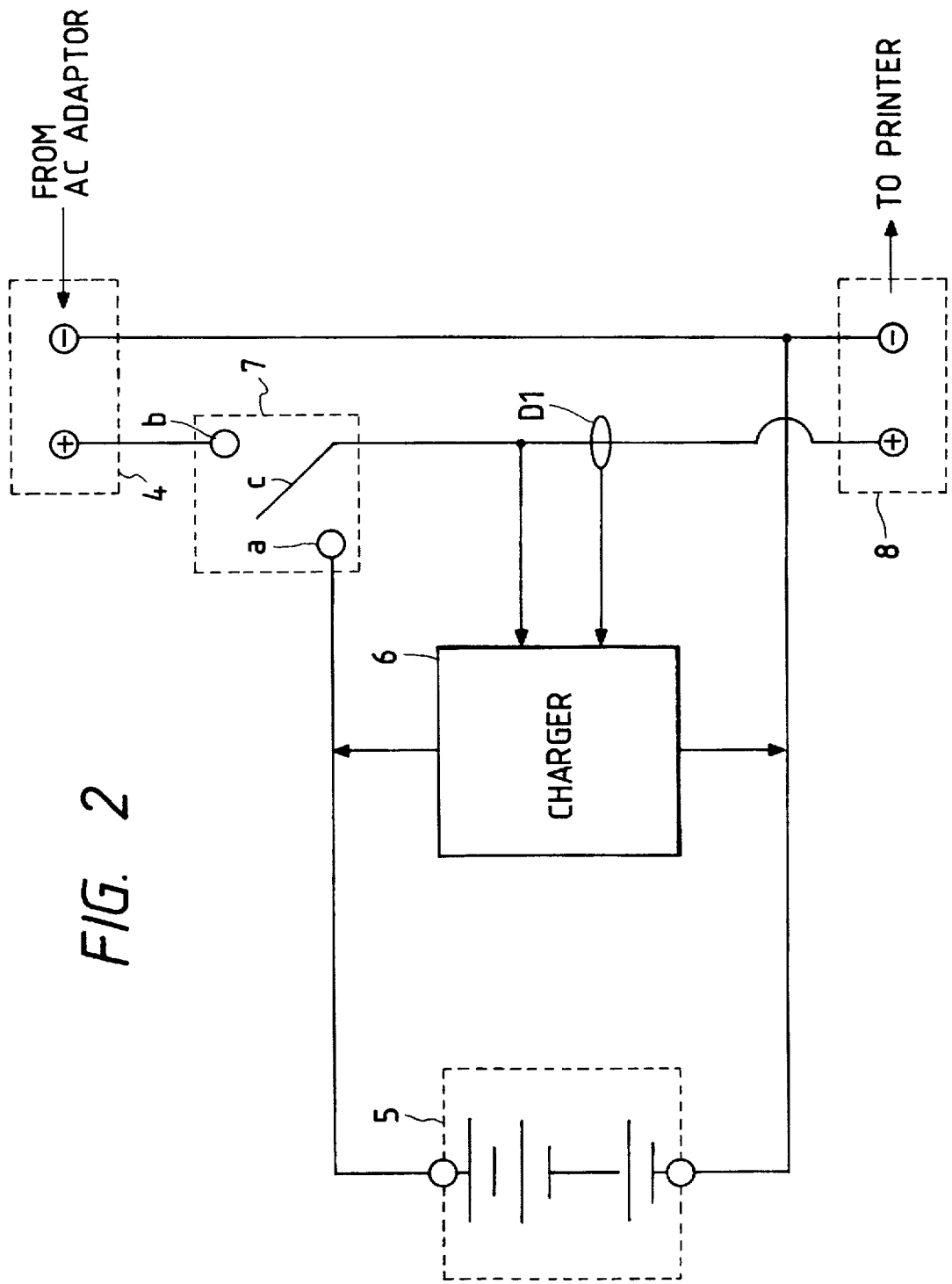
FIG. 2 is a circuit diagram showing an internal construction of the power supply.

FIG. 2 shows an internal construction of the power supply 1.

In FIG. 2, reference numeral 4 denotes the jack as a connecting member for detachably connecting the plug 11 of the AC adaptor 3 mentioned above; 5 a battery as a power source to drive the printer 2; 6 a charger to charge the battery 5; 7 a switch for switching a mode for performing a power supply to the printer 2 by an output of the battery 5 or a mode for performing such a power supply by an output of the AC adaptor 3 connected to the jack 4; and 8 the plug as a connecting member for outputting a power source to the printer.

The above component elements will be further described. The battery 5 can also have a group battery construction instead of a state of a single cell so that the printer 2 can be driven by a sufficient electric power.

The plug 8 is common to the plug 11 of the AC adaptor 3 and is detachably connected to an AC adaptor connecting jack (not shown) (similar to the lack 10 in the conventional apparatus of FIG. 3) provided for the outer casing of the printer 2 and can supply a power source to the printer.

Further, the switch 7 switches a movable contact (c) to a fixed contact (a) side, thereby connecting the battery 5 to the plug 8. The switch 7 switches the movable contact (c) to a fixed contact (b) side, thereby connecting the jack 4 to the plug 8. As a switch 7, it is possible to use a switch that is manually switched or a switch that is automatically switched as follows so as to be mechanically interlocked with the attachment (connection) or detachment (disconnection) of the plug 11 of the AC adaptor 3 to/from the jack 4.

(1) When the plug 11 of the AC adaptor 3 is connected to the jack 4, the movable contact (c) is switched to the fixed contact (b) side, the jack 4 is connected to the plug 8, and the output of the AC adaptor 3 is applied to the plug 8, thereby supplying the power source.

(2) When the plug 11 of the AC adaptor 3 is not connected to the jack 4, the movable contact (c) is switched to the fixed contact (a) side, the battery 5 is connected to the plug 8, and the output of the battery 5 is applied to the plug 8, thereby supplying the power source.

The functions and operation of the embodiment will now be described.

Figure 4A:
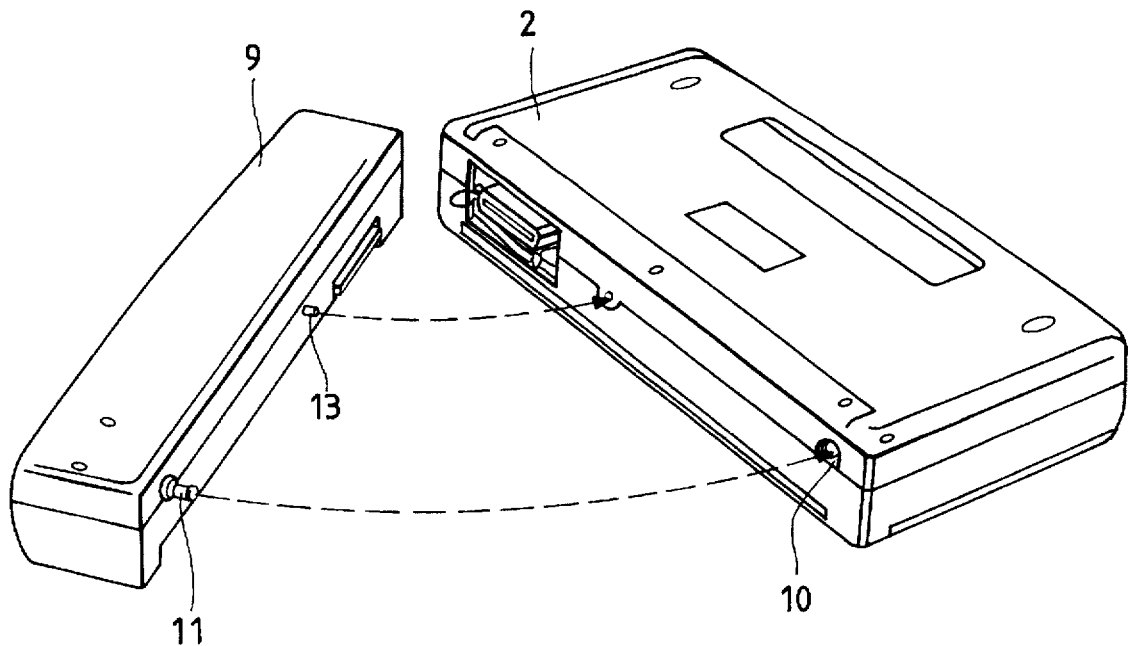
FIGS. 4A and 4B are perspective views showing a conventional power supply by a battery pack.
Figure 4B:
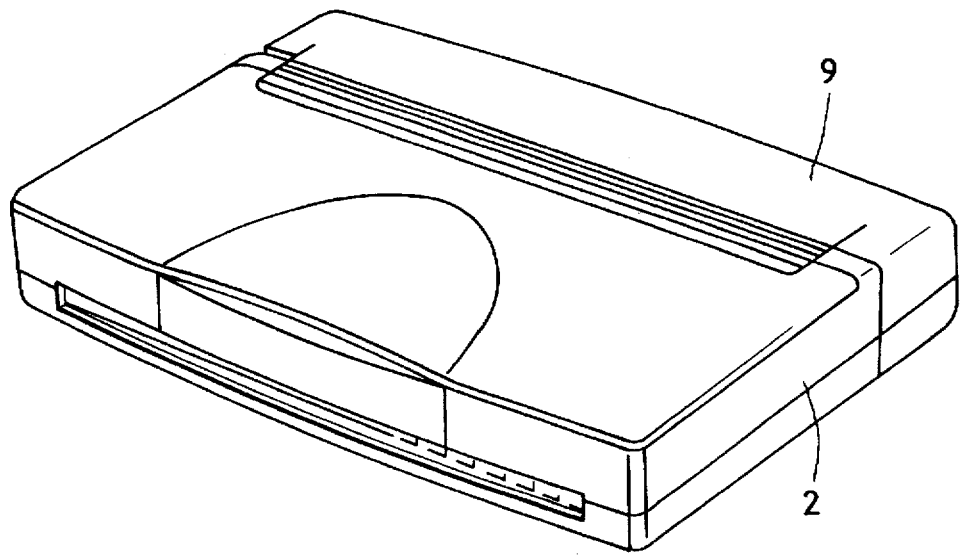

In a manner similar to the conventional battery pack 9 of the externally attaching type of FIG. 4, the power supply 1 is detachably attached to the outside surface of the outer casing of the printer 2 by an attaching member (not shown). The plug 8 is connected to an AC adaptor connecting jack (not shown) of the printer 2. Since the power supply 1 is externally attached to the printer 2 as mentioned above, it is unnecessary that a space to enclose the power supply 1 is provided in the printer 2, so that the printer 2 can be miniaturized.

When the power supply 1 is not attached to the printer 2, the plug 11 of the AC adaptor 3 is connected to the AC adaptor connecting jack (not shown) of the printer 2, so that the printing operation can be performed by the power supply by the AC adaptor 37

On the other hand, when the power supply 1 is attached to the printer 2, the following operations can be executed.

First, in the case where the battery 5 is sufficiently charged and the plug 11 of the AC adaptor 3 is not connected to the jack 4, the movable contact (c) of the switch 7 is automatically or manually switched to the fixed contact (a) side. The battery 5 is connected to the plug 8 connected to the AC adaptor connecting jack of the printer 2. Namely, the output of the battery 5 is applied to the plug 8. The printer 2 is driven by the power supply by the battery 5.

Second, when the battery 5 enters a low battery state, the plug 11 of the AC adaptor 3 is connected to the jack 4 and the movable contact(c) of the switch 7 is switched to the fixed contact (b) side, so that the jack 4 connected to the AC adaptor 3 is connected to the plug 8. That is, the output of the AC adaptor 3 is applied to the plug 8. The stable power supply to the printer 2 can be restarted by the AC adaptor 3.

In this instance, since the power supply from the battery to the AC adaptor is switched by the switch 7, the switching operation can be performed with the power supply 1 attached to the printer 2. There is no need to remove the power supply 1 from the printer 2 for such a switching operation. Moreover, since the electromotive force of the battery 5 is supplied to the printer 2 (although it is in the low battery state) until just before the plug 11 of the AC adaptor 3 is connected to the jack 4, the power supply to the printer 2 is not momentarily stopped until the output of the AC adaptor 3 is supplied to the printer 2. Namely, the printer 2 is not system reset. Therefore, there is no need to stop the printing operation for a recovery operation of the power supplying system such as [detection of the low battery state]→[connection of the AC adapter].

Further, since the power supply 1 of the embodiment has the charger 6, the battery 5 can be charged in a state in which the power supply 1 is attached to the printer 2. The charger 6 shares the AC adaptor 3 which is connected to the jack 4 as a power source together with the printer 2 and charges the battery 5 by an electromotive force.

To control the charging operation, it is also possible to construct in a manner such that a switch (not shown) which can be operated from the outside is provided for the outer casing of the power supply 1 and the start and end of the charging can be controlled by the operation of the switch. Or, the charger 6 can also detect the following conditions and can decide the shift to the charging operation.

(1) Connection or disconnection of the AC adaptor 3 to/from the jack 4

In case of the connection of the AC adaptor 3, the charging operation can be started.

(2) Whether the AC adaptor 3 drives the printer 2 or not

A current value D1 of a current flowing from the AC adaptor 3 to the printer 2 through the switch 7 and plug 8 is detected. Only when the printer 2 is in a standby mode in which the printing is not performed (namely, the case where the current value D1 is equal to or less than a predetermined value), the charging operation is performed.

In the judgment of (2) of the charger 6, there is a fear regarding whether the charging operation can be sufficiently performed or not with respect to the case where the printing operation is intermittently performed during the charging operation. However, such a fear is avoided by detecting a full charging state of the battery 5 (detection of a terminal voltage of the battery 5, total timer management of the charging time, etc.) by the charger 6 and by charging until the full charging state is detected.

As mentioned above, since the charger 6 exists, the troublesomeness such that the power supply 1 is removed from the printer 2 in order to perform the charging operation each time the battery 5 enters the low battery state is eliminated.

[Other embodiments]

FIGS. 5 to 10 show other embodiments.

Figure 5:
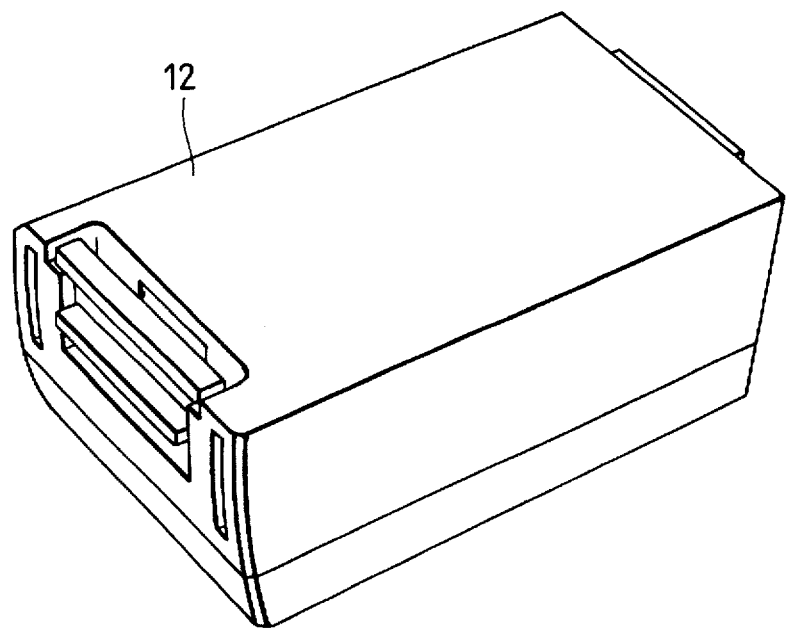
FIG. 5 is a perspective view showing an external appearance of a battery cell unit in another embodiment of the invention.
Figure 6:
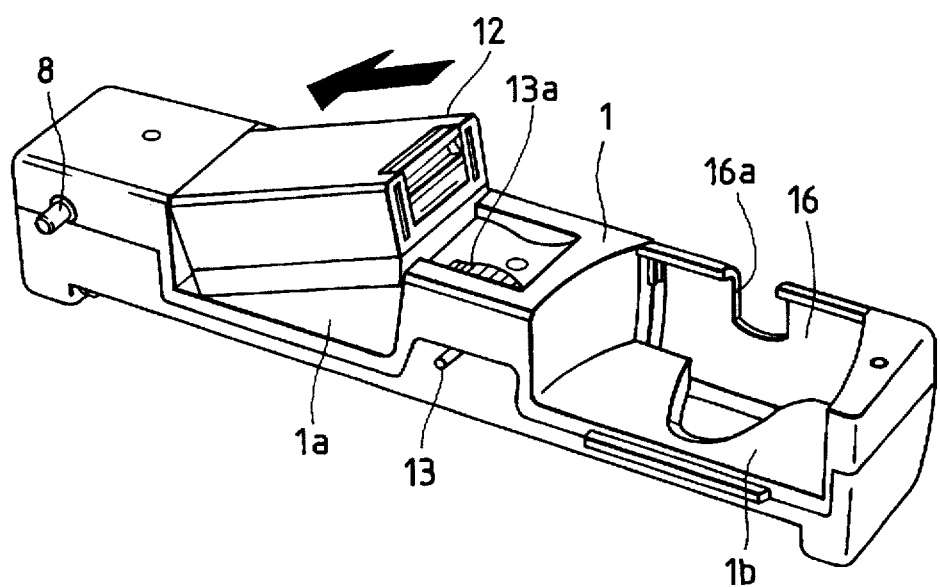
FIG. 6 is a perspective view showing a state in which the battery cell unit is attached to the power supply.

As modifications of the construction of the embodiment of FIGS. 1 and 2 mentioned above, it is also possible to construct in a manner such that the battery 5 in FIG. 2 is formed as a battery cell unit 12 shown in FIG. 5 and such a unit is detachably attached to a battery cell unit mount 1a provided for the power supply 1 as shown in FIG. 6.

Figure 7:
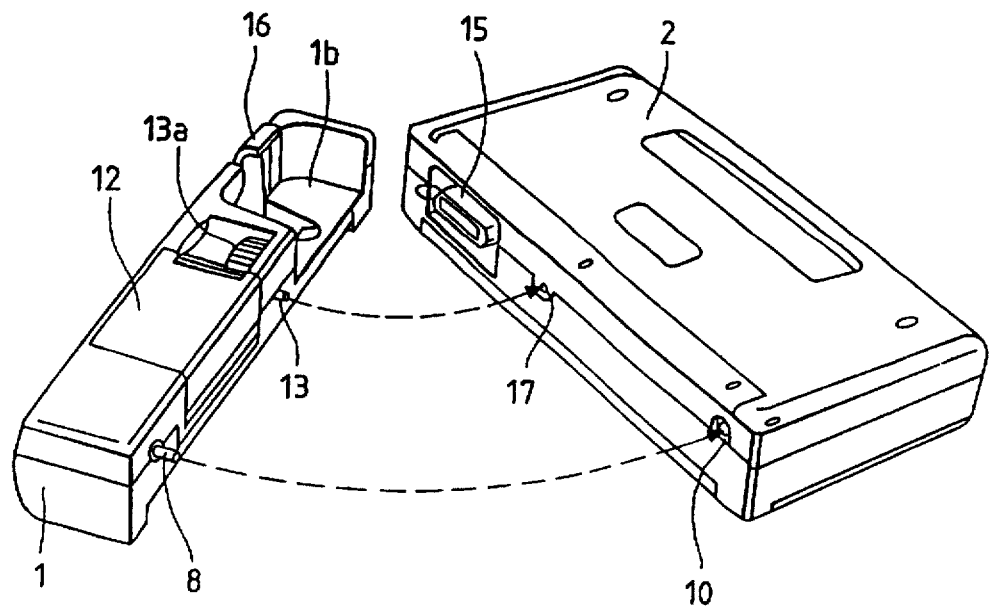
FIG. 7 is a perspective view showing a state in which the power supply attached with the battery cell unit is attached to the printer.
Figure 8B:
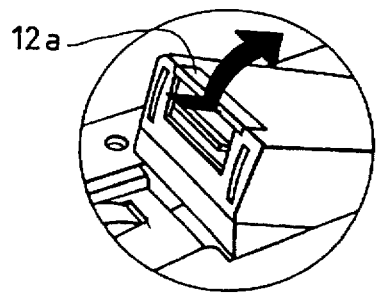
FIGS. 8A and 8B are perspective views showing a state in which the battery cell unit is removed in a state in which the power supply is attached to the printer.
Figure 8A:
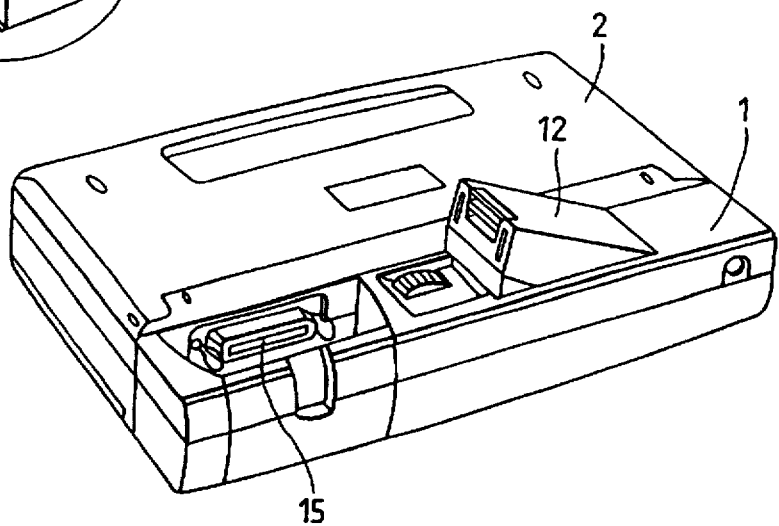

As shown in FIG. 7, the plug 8 of the power supply 1 attached with the battery cell unit 12 is inserted into the jack 10 of the printer 2 and is electrically connected. A screw 13 which can be rotated by a knob 13a provided for the power supply 1 is fastened to a screw hole 17 formed in the printer 2, thereby enabling the power supply 1 to be attached to the printer 2 as shown in FIGS. 8A and 8B. In this state, the battery cell unit 12 can be removed by pushing and pulling up a knob 12a or can be attached again.

As shown in FIGS. 6 and 7, a connector container 1b is provided for the power supply 1. A cover 16 which can be opened or closed and which has a notch 16a is provided on the outside of the connector container 1b. The connector container 1b is provided at a position which faces an externally connecting connector 15 of the printer 2.

Figure 9:
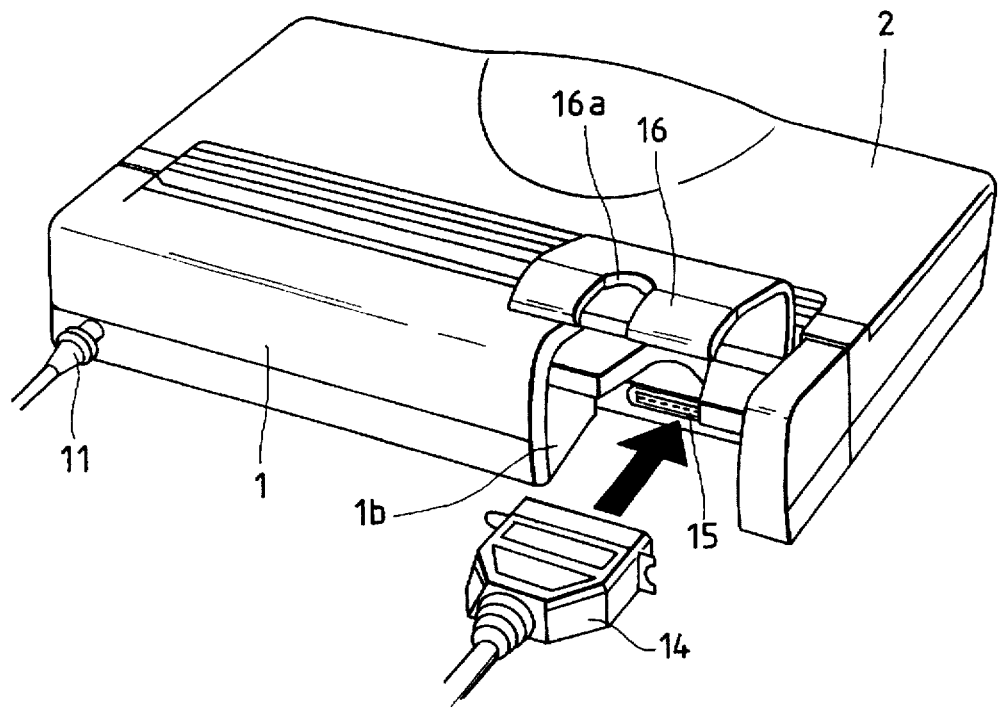
FIG. 9 is a perspective view showing a state in which a connector of a cable for connecting from an outside is connected to a connector of the printer.

As shown in FIG. 9, the cover 16 is opened, a connector 14 of a printer cable for inputting a print signal from a host apparatus or the like such as a personal computer or the like (not shown) is inserted into the connector container 1b, and the connector 14 can be connected to the connector 15 of the printer. By closing the cover 16, the cable of the connector 14 enters the notch 16a.

Figure 10:
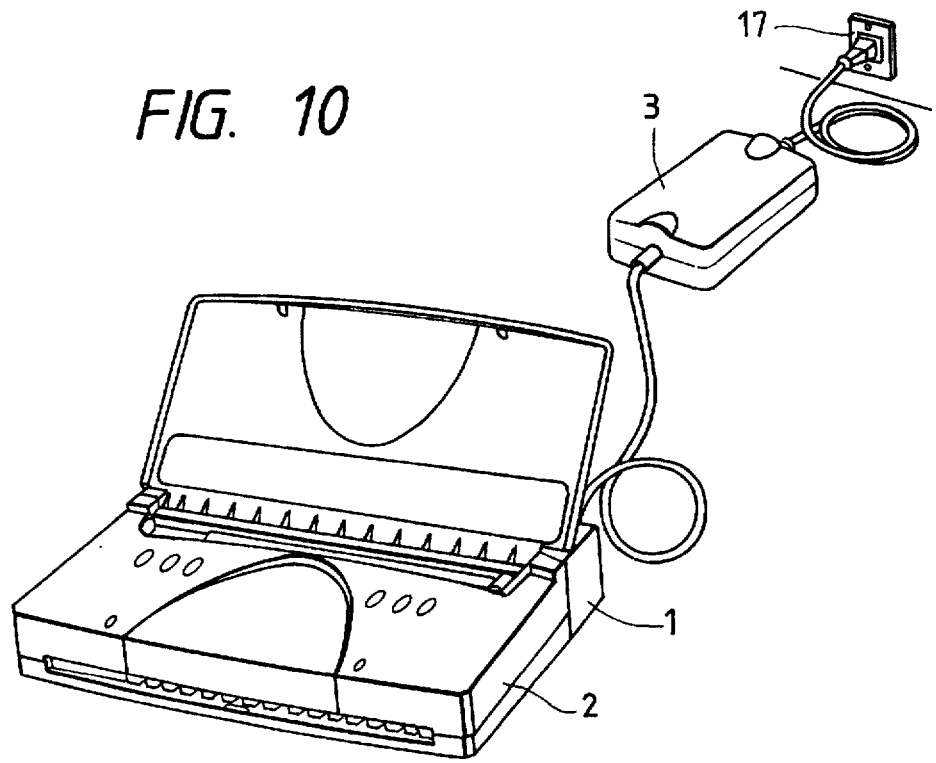
FIG. 10 is a perspective view showing a state in which the power supply is attached to the printer and an AC adaptor is connected and a printing preparation is completed.

Further, as shown in FIG. 10, by connecting the AC adaptor 3 connected to the outlet 17 of the commercially available power source to the power supply 1, the printer 2 can be driven and the printing preparation is completed.

Although the above embodiments have been shown and described with respect to the case of using the power supply 1 for the printer 2, the power supply 1 can be also used for another electronic apparatus such as a personal computer or the like.

According to the invention, as will be obviously understood from the above description, there is provided the power supply which is detachably attached to the outside surface of the outer casing of an electronic apparatus which can be driven by both a battery and an AC adapter, comprising: the battery; the first connecting member for detachably connecting the AC adapter; the switch for switching a mode for performing a power supply to the electronic apparatus by the output of the battery or a mode for performing such a power supply by the output of the AC adapter connected to the first connecting member; and the second connecting member for outputting the power source which is detachably connected to the AC adapter connecting member of the electronic apparatus. When the AC adaptor is not connected to the first connecting member, the output of the battery is applied to the second connecting member through the switch. When the AC adaptor is connected to the first connecting member, the output of the AC adaptor is applied to the second connecting member through the switch. Therefore, the following excellent effects are obtained. The power source can be supplied to the electronic apparatus by the battery or AC adaptor. When the power supply is switched from the battery to the AC adaptor in accordance with the low battery state, such a switching operation can be performed in a state in which the power supply is attached to the electronic apparatus. Moreover, the power supply is not interrupted due to the switching. There is no need to stop the operation of the electronic apparatus. Further, the space to enclose the power supply doesn't need to be formed in the electronic apparatus. The electronic apparatus can thus be miniaturized.

What is claimed is:

1. An electronic apparatus comprising:
    a first casing for supporting electronic parts therein, said first casing having a first connection terminal to which an AC adaptor is detachably connected; and
    a second casing, connected to said first casing, for supporting a battery pack, said second casing having a second connection terminal to which the AC adaptor is detachably connected, and means for connecting said second casing to said first connection terminal of said first casing,
    wherein power is supplied to the electronic parts supported in said first casing by either one of the AC adaptor connected to said first connection terminal, the AC adaptor connected to said second connection terminal, and the battery pack supported in said second casing.

2. An apparatus according to claim 1, wherein, when the AC adaptor is connected, the electronic parts are driven by the AC adaptor, and when the AC adaptor is not connected, the electronic parts are driven by a power source that is supplied from the battery pack.

3. A power supply which is detachably attached to an outer casing of an electronic apparatus which can be driven by both a battery and an AC adaptor, comprising:
    a battery;
    a first connecting member for detachably connecting the AC adaptor;
    a switch for switching between a first mode for supplying power to the electronic apparatus by an output of said battery or a second mode for supplying power by an output of the AC adaptor connected to said first connecting member; and
    a second connecting member for a power source output which is detachably connected to an AC adaptor connecting member of the electronic apparatus,
    wherein when the AC adaptor is not connected to said first connecting member, the output of said battery is applied to said second connecting member through said switch, and
    when the AC adaptor is connected to said first connecting member, the output of the AC adaptor is applied to said second connecting member.

4. A power supply according to claim 3, further comprising a charger for charging said battery by using the AC adaptor connected to said first connecting member as a power source.

5. A power supply according to claim 4, wherein when the output of the AC adaptor is applied to said second connecting member and is supplied to said electronic apparatus, said charger detects a current value of a current flowing from the AC adaptor to the electronic apparatus and only when the current value is equal to or less than a predetermined value, said charger performs a charging operation.

6. An apparatus according to claim 1, wherein the electronic parts supported in said first casing includes a control circuit for controlling a printer.

7. An electronic apparatus comprising:
- a first casing for supporting electronic parts therein, said first casing having a first connection terminal to which an AC adaptor is detachably connected;
- a second casing, detachably connected to said first casing, having a second connection terminal for connection to said first connection terminal and a third connection terminal to which the AC adaptor is detachably connected, with said second and third connection terminals being electrically connected to each other; and
- a battery detachably mounted in said second casing, wherein
- power is supplied to the electronic parts supported in said first casing by either one of the AC adaptor connected to the first connection terminal, the AC adaptor connected to the third connection terminal, and said battery mounted in said second casing.

8. An electronic apparatus comprising:
- an AC adaptor;
- a first casing for supporting electronic parts therein, said first casing having a first connection terminal to which said AC adaptor is detachably connected;
- a second casing, detachably connected to said first casing, having a second connection terminal for connection to said first connection terminal and a third connection terminal to which said AC adaptor is detachably connected, said second and third connection terminals being electrically connected to each other; and
- a battery detachably mounted in said second casing, wherein
- power is supplied to the electronic parts supported in said first casing by either one of said AC adaptor connected to said first connection terminal, said AC adaptor connected to said third connection terminal, and said battery mounted in said second casing.

9. An electronic apparatus according to claim 7, further comprising a charger for charging said battery by using the AC adaptor connected to said third connection terminal as a power source.

10. An electronic apparatus according to claim 9, wherein when the output of the AC adaptor is applied to said first connection terminal and is supplied to said electronic apparatus, said charger detects a current value of a current flowing from the AC adaptor to said electronic apparatus and only when the current value is equal to or less than a predetermined value, said charger performs a charging operation.

11. An electronic apparatus according to claim 7, wherein the electronic parts supported in said first casing includes a control circuit for controlling a printer.

12. An electronic apparatus according to claim 8, further comprising a charger for charging said battery by said AC adaptor connected to said third connection terminal as a power source.

13. An electronic apparatus according to claim 12, wherein when the output of said AC adaptor is applied to said first connection terminal and is supplied to said electronic apparatus, said charger detects a current value of a current flowing from said AC adaptor to said electronic apparatus and only when the current value is equal to or less than a predetermined value, said charger performs a charging operation.

14. An electronic apparatus according to claim 8, wherein the electronic parts supported in said first casing includes a control circuit for controlling a printer.

* * * * *

UNITED STATES PATENT AND TRADEMARK OFFICE
CERTIFICATE OF CORRECTION

PATENT NO. : 5,731,683

DATED : March 24, 1998

INVENTOR(S) : Nakanishi

It is certified that error appears in the above-identified patent and that said Letters Patent is hereby corrected as shown below:

COLUMN 1:

Line 24, "9' by" should read --9 (by--.
Line 25, "like," should read --like)--.

COLUMN 3:

Line 36, "lack 10" should read --jack 10--.

COLUMN 4:

Line 8, "adaptor 37" should read --adaptor 3.--.

Signed and Sealed this

Seventeenth Day of November, 1998

Attest:

BRUCE LEHMAN

Attesting Officer     Commissioner of Patents and Trademarks